May 30, 1972  D. C. SCHLUDERBERG  3,666,616
VAPOR SUPPRESSING MEANS FOR A NUCLEAR REACTOR
Filed Jan. 7, 1970  2 Sheets-Sheet 1
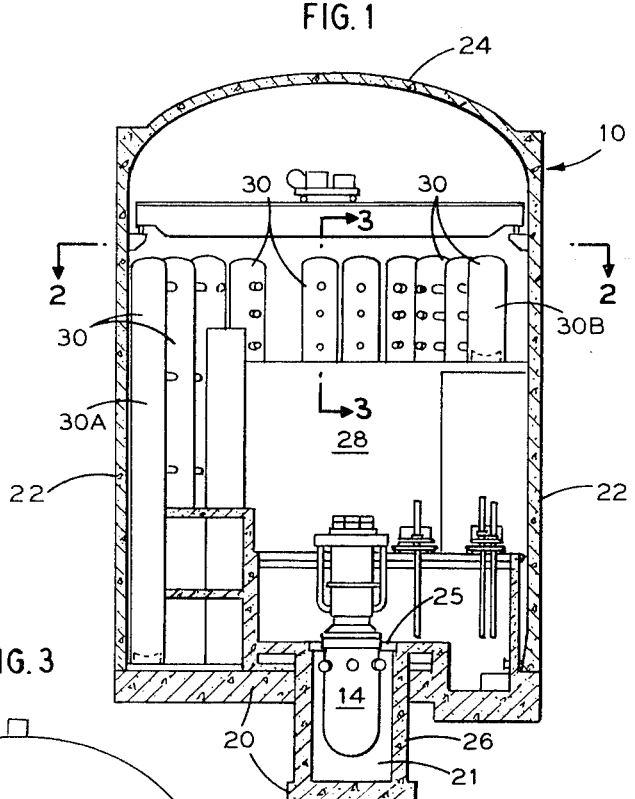
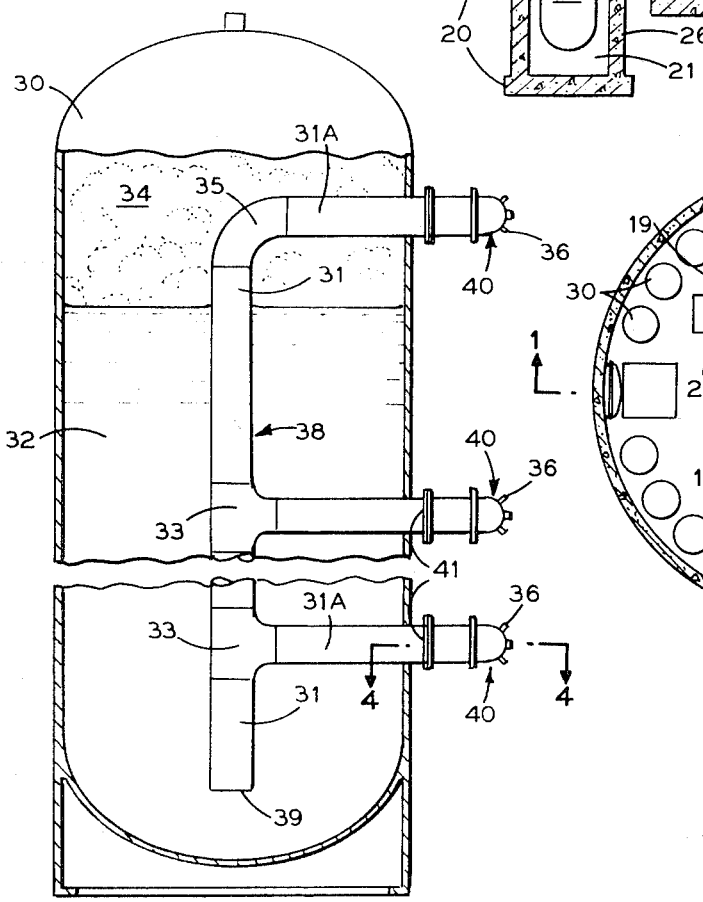
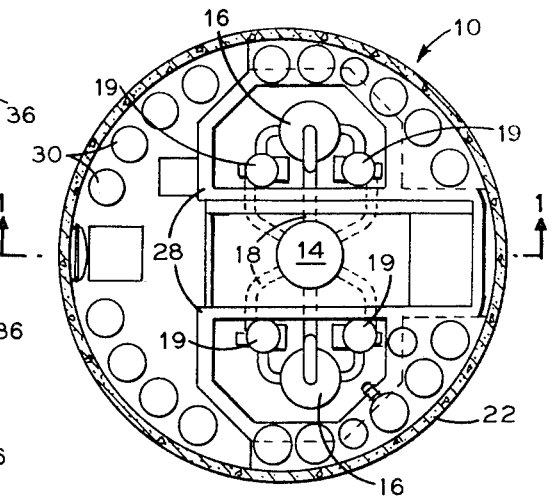
INVENTOR.
Donald C. Schluderberg
BY
*J. Maguire*
ATTORNEY

United States Patent Office 3,666,616
Patented May 30, 1972

3,666,616
VAPOR SUPPRESSING MEANS FOR A NUCLEAR REACTOR
Donald C. Schluderberg, Lynchburg, Va., assignor to The Babcock & Wilcox Company, New York, N.Y.
Filed Jan. 7, 1970, Ser. No. 1,166
Int. Cl. G21c 9/00
U.S. Cl. 176—38
10 Claims

ABSTRACT OF THE DISCLOSURE

Apparatus for suppressing vapor pressure buildup within a nuclear reactor containment including a storage tank having a quantity of fluid stored therein and provided with a rupture disk and associated apparatus for explosively activating a disk rupturing element to release the fluid from the tank and into the containment in response to a buildup in vapor pressure within the containment.

---

Nuclear reactor system are generally enclosed in substantially leaktight concrete or steel containment structures to prevent radioactive materials such as steam or water, solid or dissolved fission products, or gaseous or vaporized fission products from escaping from the containment in the event of a reactor accident involving loss of primary coolant. Alternate approaches to containment design require the structure to be either a relatively thin-walled enclosure of large volume or a thick-walled enclosur of small volume. In the former case, comparatively low pressures will develop within the structure in the event of an accident; whereas in the latter case, high pressures are developed. In either case, the containment represents a considerable portion of the total cost of a nuclear reactor plant since it is designed to contain the primary coolant and prevent the escape of the vapors generated in the course of a loss of coolant accident.

In the prior art, ancillary vapor pressure suppression equipment has been provided within the containment with a view to reducing the cost of a given containment structure. Such savings are realized on the theory that by suppressing the peak vapor pressure which develops within the order of the first one-tenth of a second of rupture of the reactor's primary coolant system, a containment can then be designed to withstand lower pressures. If the containment is not re-designed in consideration of the use of such ancillary equipment, its use can be readily justified on the basis of being a design feature that contributes to the overall safety of operation of the reactor complex, a consideration of particular importance since increasing thought is being given to locating nuclear reactor installations in populous metropolitan areas.

This invention is concerned with providing an improvement in apparatus for suppressing vapor pressure buildup within a nuclear reactor containment comprising, means for storing pressurized fluid within the containment, the storing means including nozzle means and associated rupture susceptible means cooperatively arranged for explosively driving a rupturing element into the rupturable means to rupture it in response to a buildup of vapor pressure within the containment, thereby allowing the fluid to be sprayed into the containment.

Figure 4:
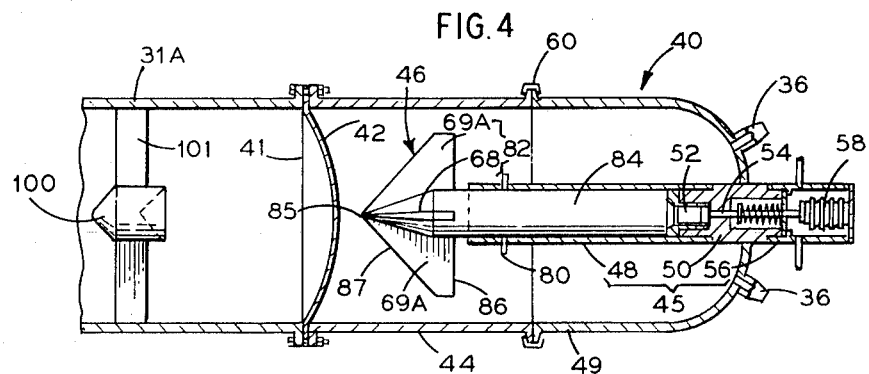
Figure 5:
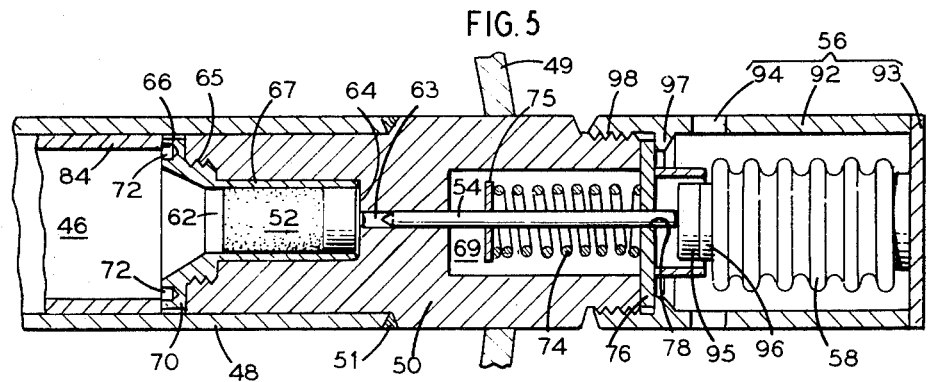
Figure 6:
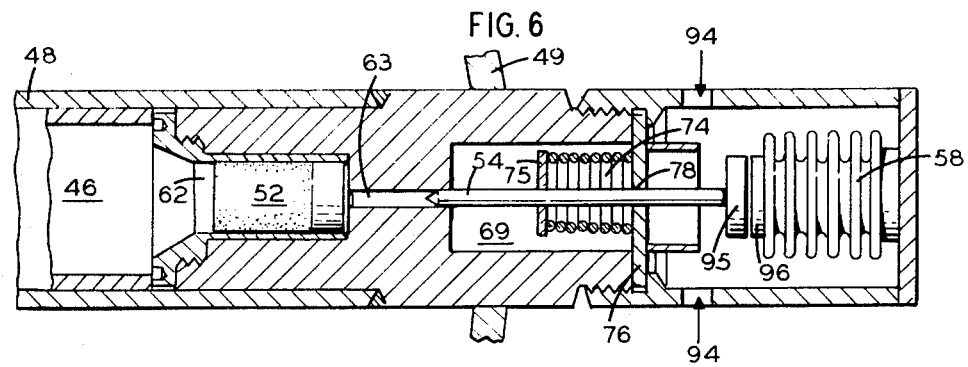
Figure 7:
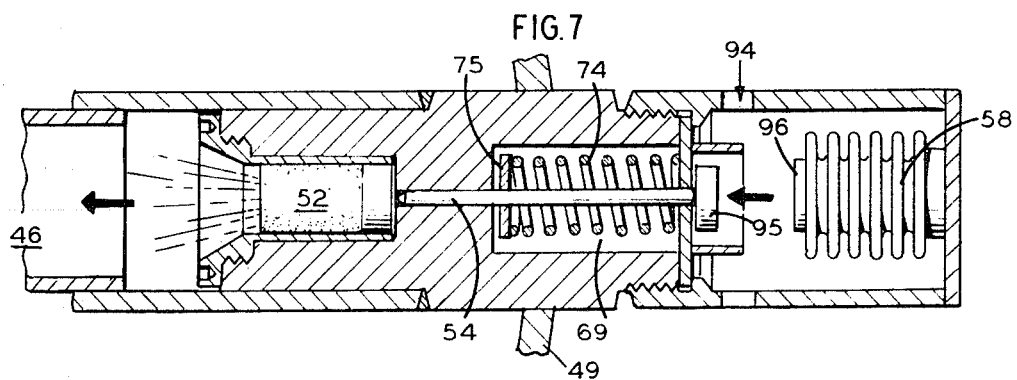

Of the drawings:

FIG. 1 is a sectional view of a reactor containment taken substantially along the line 1—1 of FIG. 2, FIG. 2 is a sectional view of the containment of FIG. 1 taken substantially along the line 2—2 of FIG. 1, FIG. 3 is an enlarged sectional view of one of the containment spray tanks of FIG. 1, taken substantially along the line 3—3 of FIG. 1, FIG. 4 is a sectional view of one of the spray nozzle assemblies of FIG. 3, taken substantially along the line 4—4 of FIG. 3, FIG. 5 is a sectional view of the spray nozzle assembly shown in FIG. 4, FIG. 6 is another sectional view of the spray nozzle assembly shown in FIG. 4, and FIG. 7 is yet another sectional view of the spray nozzle assembly shown in FIG. 4.

Referring now to the drawings wherein like reference numerals designate like or corresponding parts throughout the several views there is shown in FIGS. 1 and 2 a containment structure 10, which houses a nuclear reactor complex, comprising a nuclear reactor 14 connected in primary coolant flow communication with heat exchangers 16, via a plurality of conduits 18, some of which contain circulating pumps 19.

The containment shown in FIGS. 1 and 2 is illustrative of a typical enclosure for housing a nuclear reactor complex and generally includes an enclosure with a base 20 which defines a well 21 within which the reactor is located, an annularly-shaped upright outer wall 22, and suitably shaped roof 24. The primary coolant system illustrated in FIG. 2 is that of a pressurized water reactor complex. The reactor control system, additional primary coolant loops and other equipment well known in the art may be added, but they have been eliminated in order to simplify the discussion. Also, although the invention is adaptable to any known nuclear reactor containment structure wherein a condensible vapor may be produced, to present the preferred embodiment in an exemplary setting the following discussion is directed to solving the problem of suppressing condensible vapors produced in a containment which houses a pressurized water reactor complex.

With the reactor complex shown, the reactor 14 is disposed centrally of the containment in well 21 and supported in place over the base 20 of the containment by means of a cylindrically shaped carrying member 25 which extends laterally from the sidewall 26 into the well 21 and provides primary shielding. The containment is provided with a pair of upwardly extending inner walls 28 which laterally encircle the primary coolant system and serve as secondary shielding to minimize radiation effects within the containment in the event of a primary coolant system breakdown. The cylindrically-shaped upright side wall 26 of the well 21 protects personnel from radiation due to fluid leakage from within the pressure vessel in which reactor 14 is housed.

In accordance with the invention a plurality of vessels, for example cylindrically-shaped tanks 30, containing water under pressure, encircle the interior of the containment near its outer wall. The tanks may be made in various diameters and lengths to fit the space limitations within the containment. Thus, in FIG. 1 tank 30A is approximately 115 feet in length and 12 feet in diameter, whereas tank 30B is approximately 30 feet in length and 15 feet in diameter.

As shown in FIG. 3, the tanks are substantially filled with water 32. In the preferred embodiment the water is borated and pressurized to 200 p.s.i. with an inert gas such as nitrogen 34. For an 800 mwe. unit the tanks in the aggregate will contain approximately 100,000 cubic feet of borated water which will be available to condense the vapor which would develop within the containment as a result of a leak in the primary coolant system. In this circumstance the water is sprayed into the containment through a plurality of nozzles 36 associated with each of the tanks. Preferably, all of the nozzles on a tank should be continuously supplied with water so that the contents are rapidly released into the containment. To that end, the nozzles of each tank are connected in fluid flow communication with the water 32 in tank 30 via a plurality of nozzle assemblies 40, which are serially connected to a common supply conduit 38 that extends below the water level, so that the inlet 39 is near the bottom of the tank.

The conduit 38 together with fittings 33 and 35 and piping connections 31, 31A fitted as shown in FIG. 3, are arranged to supply fluid to each nozzle assembly 40 via the outlets 41.

According to the invention, each of the outlets 41 is sealed closed by the rupturable member or rupture disk 42 which isolates nozzle assembly 40 from the contents of the tank. One of the rupture disks 42 is shown in FIG. 4. It is preferably a disk of metal secured to and closing over the outlet 41 with which it is associated. Flanges of complementary configuration on the outlet 41 and the conduit section 44 facilitate compressing the periphery of the disk between them to seal off the outlet. The conduit sections 44 also serve as functions for mounting each individual nozzle assembly 40, and facilitate removal and periodic maintenance of an assembly 40 while its associated outlet 41 is closed. In addition, the flanges which hold the disk in place are preferably bolted together to facilitate replacement of a rupture disk.

As shown in FIG. 4, the preferred nozzle assembly 40 includes at least one spray nozzle 36, a projectile propelling apparatus assembly 45 for explosively driving a projectile or rupture element 46 into the disk 42 with which the assembly is associated, and a housing 49 which also serves as a support base for the nozzle(s) and apparatus 45.

Referring to FIG. 5 the projectile driving apparatus 45 includes a chamber piece 50, a barrel 48, and a receiver 56. The chamber piece 50 has the inner end adapted to receive a percussion detonatable explosive charge 52, and the distal end adapted to receive a spring-loaded firing pin 54; the barrel 48 has its inner end open to receive the projectile 46, and the outer end connected to the charge receiving end of the chamber piece 50. The receiver 56 has its inner end connected to the distal end of the chamber piece 50, the other end closed. It is adapted to house the pressure responsive means 58 for actuating the firing pin.

The housing 49 is preferably of generally bell-shaped cross-section and welded circumferentially of the exterior of the chamber piece 50. The open end of the housing encircles the barrel 48 of the projectile driving apparatus 45 and terminates in a flange for mounting the nozzle assembly on the conduit section 44. The closed end has a bulbous contour encircling the chamber piece 50 and affording mounting for the nozzle 36. As shown in FIG. 4, the end of the conduit 44 upon which the nozzle assembly is mounted terminates in a flange of complementary configuration to that of the housing 49. The flanges are preferably connected together by a quick-disconnect device 60 to facilitate removal of the nozzle assembly for inspection and repair.

Although the nozzles 36 may be any type of spray nozzle well known in the art, it is preferred that a plurality of them are deployed in a circular array about the bulbous portion of the housing 49 to project the water which is sprayed from them into the largest possible volume of the containment.

The explosive charge 52 may be a primed shotgun shell, loaded with a suitabe quantity of explosive propellant such as smokeless powder. In the context of the invention however a propellant charge only is required since a specially adapted projectile is provided. To facilitate utilizing commercially available shotgun shells, the charge receiving end of the chamber piece 50 is preferably axially bored to form a cylindrically-shaped chamber 62 which is sized to receive the rim 64 of the shotgun shell, and to a depth somewhat greater than is necessary to house the shell. The greater depth is provided to allow for counterboring the chamber piece 50 coaxially of the chamber 62 to a depth sufficient to allow an internal thread 65 to be formed at that end of chamber piece for threadably receiving an externally threaded sleeve 66. The sleeve has a skirt portion 67 which extends into the chamber and around the shell. Since the outer diameter of the skirt 67 is less than that of the rim 64, the free end of the skirt engages the rim, and thus secures the shell in place within the chamber piece. The sleeve preferably has a lip 70 to facilitate threading the sleeve in place, the recesses 72 being provided to receive a spanner wrench. The lip also supplies the bulk needed for countersinking the sleeve 66 to form a generally frusto conically-shaped orifice that allows the gases developed due to explosion of the charge to laterally expand prior to entering the barrel 48.

The firing pin end of the chamber piece 50 is axially bored to form a cylindrically-shaped channel 63 extending completely through the chamber piece for slidably receiving the forward end of the firing pin 54 in the chamber piece. The same end of the chamber piece 50 is also counterbored coaxially of the channel 63 to form a cavity 69 to receive a spring collar assembly. The spring 74 is secured to the collar 75, as is the firing pin near its forward end. The firing pin is also laterally supported by means of a disk-like plate 76, which covers the firing pin end of the chamber piece and is provided with an axially located opening 78 for slidably receiving the firing pin in the plate near the rearward end of the firing pin. The channel 63 and opening 78 are coaxially aligned with one another to promote rectilinear motion of the firing pin.

The barrel 48 is a cylindrically shaped tube within which the projectile is housed. The charge receiving end of the chamber piece 50 is inserted in one end of the barrel and is secured by circumferential weld 51 as shown in the FIG. 5. A shear wire 80 or pin, or the like, shown in FIG. 4, is inserted in a hole drilled through the projectile 46 and barrel 48 to hold the projectile in place within the barrel during transport and maintenance of the nozzle assembly. As a consequence, the wire need only be of sufficient shear strength to prevent movement of the projectile under the influence of little more than the force of gravity. When the charge is detonated the wire is sheared as the projectile moves out of the barrel.

The projectile 46 is an arrow-like member mounted in barrel 48 and when it is explosively propelled from the barrel is capable of rupturing the disk 42 with which it is associated. The projectile includes the head and shaft portions, generally designated as portions 82 and 84 in FIG. 4. To simplify the description, the shaft 84 will be considered to be the hollow tubular part of the projectile which is slidably movable endwise within the barrel with which it is associated, whereas the head will be considered to be the part which projects from the barrel. The head 82 thus includes the cone-shaped portion 68 which terminates in the apex or point 85 at the end of the shaft 84, and the generally triangularly-shaped members 69A each of which have an edge connected to the cone-shaped portion of the head and extend radially therefrom. They each have trailing and leading edges, respectively designated 86 and 87 in FIG. 4, and are preferably tapered in cross-section along a centerline bisecting the leading edge and the edge connected to the cone-shaped member. As a consequence, when viewed from the forward end of the projectile the leading edges of the members 69A describe a plurality of wedge shaped surfaces connected to one another at their apices and at the point 85 formed by the cone-shaped portion of the head.

When loaded, the rear end of the projectile abuts against the sleeve 66 as shown in FIG. 5.

The receiver 56 is a housing for supporting the pressure responsive means in operative relationship with respect to the firing pin to cock and release the pin in response to a rise in atmospheric pressure within the containment. In the preferred embodiment the pressure responsive means is a cylindrically-shaped bellows 58 having one end connected to the firing pin. To protect the bellows from inadvertently being mechanically damaged or tampered with, the housing 56 is constructed to enclose the bellows. The receiver or housing thus includes a cylindrically-shaped member 92 having a plurality of openings 94 formed therein to expose the bellows to the environment exterior of the housing. The one end of member 92 is closed by a circularly-shaped plate 93 and is preferably secured in place as shown in FIG. 5, with the one end of the bellows connected to the plate to coaxially align the bellows within the member 92. Thus the bellows is mounted to expand and contract with respect to plate 93 and coaxially of the member 92 in response to variations in the environmental gas pressure which is existing external of the bellows. The cylindrically-shaped magnets, 95 and 96, respectively connected to the rear end of the firing pin and free end of the bellows, are polarized to attract one another. Normally the magnets are coupled together since both the bellows and spring are expanded as shown in FIG. 5.

The open end of the cylinder 92 is counterbored to form an annularly-shaped shoulder 97 within the cylinder, and the cylinder body projecting beyond shoulder 97 is internally threaded as indicated at 98 for threadably mounting the housing 56 on the firing pin end of the chamber piece 50, the latter being provided with complementary external threads for this purpose. To facilitate testing, adjustment and inspection of the bellows, firing pin spring and magnets, the plate 76 is removably jammed against the firing pin end of the chamber piece by the shoulder 97 of the cylinder 92 when it is threadably mounted in place.

As shown in FIG. 1 the nozzle assemblies associated with each of the tanks 30 are oriented to project the spray from the tanks towards the center of the reactor containment 10. In the event of a leak developing in the primary system whereby primary coolant enters the containment, the fluid flashes into steam and increases the environmental pressure within the containment. The increase in pressure transmitted via openings 94 to the interior of receiver housing 56, causes the bellows 58 associated with each of the nozzle assemblies to axially contract, as shown in FIG. 6 causing the free end to move toward the end plates 93 of the associated receiver 56. Since the free end is magnetically coupled to firing pin 54 by magnets 95 and 96, the firing pin 54 is slidably withdrawn from the associated chamber piece 50 together with its associated collar 75, moving rearwardly within a cavity 69 and thus compression spring 74 as the pin 54 is withdrawn from a chamber piece channel 63. When the energy stored in a given spring overcomes the coupling energy of the magnets, see FIG. 6, or the spring is totally compressed against its associated chamber piece plate 76 and further compression thereagainst by the collar 75 is no longer possible, the magnets will separate from one another. At the moment of separation the bellows 58 further contract as shown in FIG. 7 thereby rapidly reducing the coupling force between magnets 95 and 96. The firing pin is thereupon forcibly driven into the primers of the associated charge to explode it, causing the projectile 46 to be launched from the barrel 48 and towards the associated disk 42 to rupture it.

In the preferred embodiment the fin-like members 69A which are mounted on the projectile head 82, extend radially from the axes of the associated cone-shaped head member 68, a distance in excess of the radius of the shaft 84 of the projectile. The head will thus pierce the associated disk and form slots therein which radiate radially of the centers of the disk. Perforation of the disk causes distention of the material from its axes and towards its circumference as the projectile's head passes through the disk. The pressurized water from the tanks is thereupon forced through the ruptured disk, into the nozzle assembly, and sprayed therefrom via the nozzles 36 into the containment 10. The spray condenses the flashed vapor within the containment to suppress the vapor pressure.

To halt the forward motion of the projectiles, each of the headers is provided with a plurality of projectile stops mounted therein. Although other stopping means are possible, in the illustrated embodiment, each of the pipe connections 31A which form an outlet opening 41 over which a disk 44 is a mounted, is provided with a stop 100 mounted axially thereof. Each of the stops 100 is supported in place by arms 101 which are connected to the interior of the pipe 31A and to the exterior of the stop 100. The stops are spaced from the openings 41 with which they are associated a distance sufficient to allow the entire head portion of a projectile 46 to enter the pipe 31A before its forward motion is arrested by the associated stop 100, thereby positively assuring that the head of the projectile does not block the opening it forms in the disk.

What is claimed is:

1. In combination, a nuclear reactor, housed in a pressure vessel heat exchanger means operatively connected to said reactor, pressure vessel wall means defining a containment structure for housing said reactor, vessel and heat exchange means, and an apparatus located within the containment structure for suppressing the buildup of vapor pressure therein including at least one pressurized fluid containing tank for storing a pressurized fluid within the containment structure, said tank being spaced from said pressure vessel, the tank having at least one outlet for the ffuid, nozzle means connected to said outlet for spraying the fluid from the tank into the containment structure, rupturable sealing means in said outlet for normally sealing said outlet and for normally preventing the nozzle means from spraying the fluid into the containment structure, and means including an explosive charge and a rupturing element cooperatively associated with and secured to said nozzle means for explosively driving said rupturing element into the rupturable means to rupture it in response to a buildup of vapor pressure within the containment structure, and to allow the fluid to be sprayed into the containment structure.

2. The combination as set forth in claim 1 wherein said fluid is borated water.

3. The combination as set forth in claim 1 wherein the outlet is in continuous fluid flow communication with the fluid until substantially all of the fluid is emptied from the tank.

4. The combination as set forth in claim 1 wherein the means for explosively driving the rupturing element includes means for detonating said explosive charge to explosively drive the rupturing element into the rupturable means.

5. The combination as set forth in claim 3 wherein the means for explosively driving the rupturing element includes, a detonatable explosive charge, and a firing pin which is actuated in response to the buildup of vapor pressure within the containment structure to detonate the explosive charge for driving the rupturing element into the rupturable member.

6. The combination as set forth in claim 5 wherein the means for explosively driving the element further includes, a bellows cooperatively associated with the firing pin to actuate it in response to the buildup of vapor pressure within the containment structure.

7. The combination as set forth in claim 6 wherein the bellows is normally magnetically connected to the firing pin.

8. The combination as set forth in claim 6 wherein the firing pin is connected to a normally relaxed spring, and the bellows moves the firing pin and compresses the spring and then releases the firing pin for detonating the charge in response to the buildup in vapor pressure within the containment structure.

9. The combination as set forth in claim 6 wherein the firing pin is connected to a spring, the bellows is normally magnetically coupled to the firing pin and spring loads the firing pin in response to the buildup of pressure within the containment structure before releasing it to detonate the charge.

10. The combination as set forth in claim 1 wherein the fluid is mostly water.

References Cited

UNITED STATES PATENTS

| 3,168,445 | 2/1965 | Ziegler et al. | 176—38 |
| 3,528,884 | 9/1970 | Collier et al. | 176—38 X |

OTHER REFERENCES

APEX-388, December 1956, pp. 7, 8, 13, 21, 23, 26, 29, 30, 31.

NAA-SR-276(Del.), 1953, pp. 4, 7, 8, 9, 10.

KAPL-M-LBV-7, 1957, pp. 28, 29.

CARL D. QUARFORTH, Primary Examiner

H. E. BEHREND, Assistant Examiner